M. A. O. JONES.
EXTENSION STEP FOR CARS.
APPLICATION FILED FEB. 19, 1910.
999,653.
Patented Aug. 1, 1911.
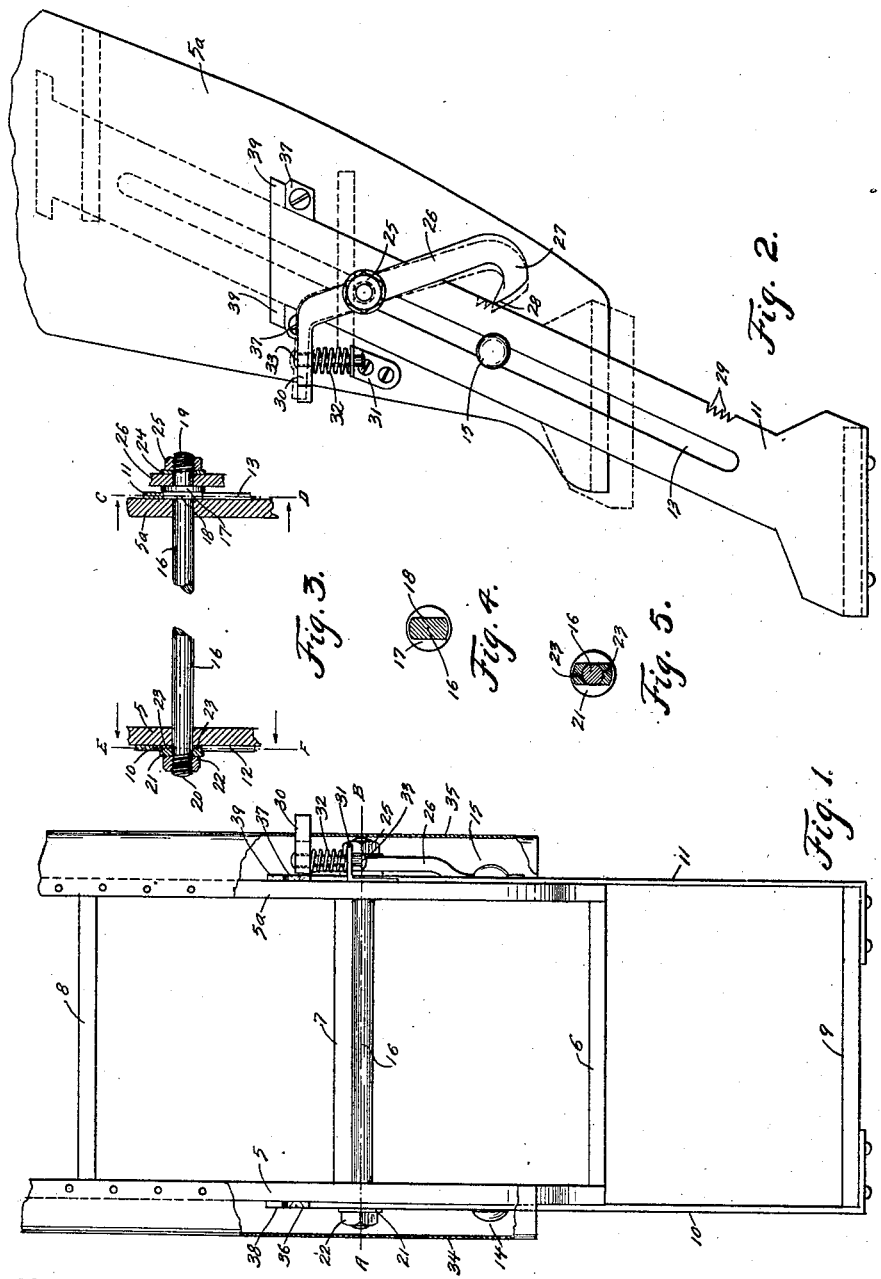
WITNESSES:
INVENTOR
Mabel A. Orme Jones
BY
ATTORNEY

UNITED STATES PATENT OFFICE.

MABEL A. ORME JONES, OF ROCHESTER, NEW YORK.

EXTENSION-STEP FOR CARS.

999,653.   Specification of Letters Patent.   Patented Aug. 1, 1911.

Application filed February 19, 1910. Serial No. 544,950.

*To all whom it may concern:*

Be it known that I, MABEL A. ORME JONES, a citizen of the United States of America, residing at Rochester, in the county of Monroe and State of New York, have invented a certain new and useful Extension-Step for Cars, of which the following is a full, clear, and exact description.

My invention relates to adjustable car steps and has for its primary object to provide a device which shall make unnecessary the use of the small stool which, at the present time, the conductor or porter of the train is obliged to place in position so as to make the bottom tread of the platform steps of the car accessible to the passengers.

Moreover my invention provides a device which is very simple and cheap to manufacture and at the same time effective in operation.

In the drawings, which form part of this specification, similar characters of reference indicate corresponding parts in the several views of which:

Figure 1 is a front elevation of my device with the protecting hoods partly broken away. Fig. 2 is a side elevation with the protecting hood removed and like Fig. 1 shows the lower step extended and ready for use, the dotted lines showing it pushed up into place. Fig. 3 is a fragmental section on line A—B of Fig. 1 and shows the stud and bearing washer. Fig. 4 is a section of the stud taken on line C—D of Fig. 3. Fig. 5 is a section of the bearing washer used at one end of the stud and is taken on line E—F of Fig. 3.

5 and 5ª are the casings and 6, 7 and 8 the fixed treads of any railroad car steps to which my device may be attached and 9 is the extensible tread which forms part of my invention. The extensible tread 9 is slidably supported by means of the metallic sliding members 10 and 11 to which it is suitably secured. These sliding members lie parallel with and bear against the outside face of the casings 5 and 5ª and are provided with slots 12 and 13.

Secured to the casings 5 and 5ª and slidably disposed in the slots 12 and 13 are guide studs 14 and 15 respectively, which serve as guides for the sliding members 10 and 11.

A screw-threaded stud 16 passes through both casings at a point preferably just beneath the fixed tread 7 and provides bearings and stops for the sliding members 10 and 11. The screw-threaded stud 16 (Fig. 3) at a point some little distance from the end 19 is preferably formed with a collar 17 and a flattened portion 18 (Fig. 4). The flattened portion 18 forms an increased bearing area for the sliding member 11 and also a shoulder by which the stud may be brought to bear firmly against the side of the casing 5ª without clamping the sliding member 11, which is slidably held in place upon said flattened portion by means of the collar 17. The end 20 of the stud 16 is screw-threaded and provided with a bearing washer 21 and a nut 22 by which the stud 16 is firmly held in place.

The bearing washer 21 is provided with lugs 23 (Fig. 5) which being disposed diametrically opposite are flattened and form a bearing for the sliding member 10. The length of the lugs 23 are slightly greater than the thickness of the sliding member 10 thus making it possible to draw the bearing washer 21 down firmly against the casing 5 and still allow of a free action of the sliding member 10.

The end 19 of the stud 16 projects beyond the collar 17 for some distance and is provided with a screw-thread. A washer 24 and a nut 25 (Fig. 3) are provided on the end 19 of said stud. On the end 19 of the stud 16, between the washer 24 and the collar 17, is rotatably mounted a catch lever 26. This lever lies obliquely across the outer face of the sliding member 11 and the lower end, which comes at the back of the sliding member, is formed into a hook 27. Notches 27 are cut in the back edge of the sliding member 11 and the extreme point 28 of the hook 26 is sharpened and fits into one of the said notches when the sliding members 10 and 11 are in their uppermost position. The upper end 30 of the catch lever 26 is bent at an angle which brings the upper face of the same in substantially a horizontal plane. The end 30 which is the operating end of the lever 26 is flared out and its outer end is bent at right angles in a horizontal plane. Secured to the outer surface of the casing 5ª and at some suitable distance beneath the flared end 30 of the lever 26 is a spring support 31. Between the spring support 31 and the flared end 30 of the lever 26 is mounted a spiral spring 32. A pin 33 passes loosely through the spring support 31 and the end 30 of the lever 26, the ends of which pin are, preferably, burred over to prevent it from falling out of place. The pin 33 passes through the center of the spring 32 whereby the same is held in its proper position.

As hereinbefore stated the stud 16 provides stops for the sliding members 10 and 11, but I preferably employ additional stops 36 and 37, the upper ends of the sliding members being provided with flanges or lugs 38 and 39 to engage with the stops 36 and 37. The last mentioned stops are secured in their proper position on the casings 5 and 5ª by any suitable means. The stops 36 and 37 engage the lugs 38 and 39 of the sliding members 10 and 11 when the extensible tread is in its lowermost position.

Protecting hoods 34 and 35 are preferably employed to protect the mechanism of my invention from the weather. These hoods may be secured to the casings 5 and 5ª in any suitable manner, an opening being left in the hood 35 for the operating end 30 of the lever 26 to project through.

It is of course understood that all the screw-threaded portions of my device will be properly locked in place so that there will be no possibility of them becoming loose by the jarring of the car to which my device is attached.

Having thus described my invention I will now describe its operation.

In Fig. 2 the dotted lines show the position of the device when not in use and when in this position all that is necessary to put it to use is to press the operating end 30 of the catch lever 26, which will throw the sharpened end 28 of said lever out of engagement with the teeth 29 in the sliding member 11 whereupon the extensible tread will drop to its lowermost position, where it will be firmly and strongly held by the hereinbefore mentioned stops. After being used the tread is simply raised to its uppermost position by hand or in any other suitable way as the normal tendency of the spring 32 is to cause the point 28 of the lever 26 to bear against the back edge of the sliding member 11, the same will engage some one of the notches 29 in said sliding member and hold the same in position and ready for further use.

What I claim is:

1. The combination with fixed car steps provided with casings; of an adjustable step comprising an extensible tread, sliding members secured to and supporting said tread, longitudinal slots provided in said sliding members, guiding studs secured to said casings and disposed in said slots, a screw-threaded stud disposed beneath one of said fixed car steps and having its ends passing through said casings and disposed in said longitudinal slots, said studs being so disposed as to form stops for the downward movement of said tread and spring-pressed means carried by one end of said screw-threaded stud for holding said tread in its uppermost position.

2. The combination with fixed car steps provided with casings; of an adjustable step comprising an extensible tread, sliding members secured to and supporting said tread, longitudinal slots provided in said sliding members, guiding studs secured to said casings and disposed in said slots, a screw-threaded stud passing through said casings provided with casings; of an adjustable step and an extended end projecting from said collar, a bearing washer, spring-pressed means rotatably mounted upon said extended end whereby said tread is releasably held in its uppermost position.

3. The combination with fixed car steps provided with casings; of an adjustable step comprising an extensible tread, sliding members secured to and supporting said tread, longitudinal slots provided in said sliding members, guiding studs secured to said casings and disposed in said slots, notches provided in one of said sliding members, a screw-threaded stud passing through said casings provided with a flattened portion, a collar and an extended end projecting from said collar, a bearing washer, spring-pressed means rotatably mounted upon said extended end and engaging said notches in said sliding member whereby said tread is releasably held in its uppermost position.

4. The combination with fixed car steps provided with casings; of an adjustable step comprising an extensible tread, sliding members secured to and supporting said tread, longitudinal slots provided in said sliding members, guiding studs secured to said casings and disposed in said slots, notches provided in one of said sliding members, a screw-threaded stud passing through said casings and said slots and being provided with a flattened portion, a collar and an extended end projecting from said collar, a catch lever rotatably mounted upon said extended end and having its lower end in engagement with said notches in said sliding member whereby said extensible tread is releasably held in its uppermost position.

5. The combination with fixed car steps provided with casings; of an adjustable step comprising an extensible tread, sliding members secured to and supporting said tread, longitudinal slots provided in said sliding members, guiding studs secured to said casings and disposed in said slots, notches provided in one of said sliding members, a screw-threaded stud passing through said casings and said slots and being provided with a flattened portion, a collar and an extended end projecting from said collar, a catch lever rotatably mounted upon said extended end, a spring support, a spiral spring mounted upon said spring support and having its upper end in contact with the upper end of said catch lever whereby the lower end of said catch lever is engageable with said notches in said sliding member.

6. The combination with fixed car steps provided with casings; of an adjustable step comprising an extensible tread, sliding members supporting said tread and provided at their upper ends with lugs, longitudinal slots provided in said sliding members, guiding studs secured to said casings and disposed in said slots, notches provided in one of said sliding members, a screw-threaded stud passing through said casings and said slots, auxiliary stops secured to said casings in a position to contact with said lugs on said sliding members and a spring-pressed catch lever rotatably mounted upon said stud and having its lower end engageable with said notches in said sliding member.

7. The combination with fixed car steps provided with casings; of an adjustable step comprising an extensible tread, sliding members supporting said tread and provided at their upper ends with lugs, longitudinal slots provided in said sliding members, guiding studs secured to said casings and disposed in said slots, notches provided in one of said sliding members, a screw-threaded stud passing through said casings and said slots, auxiliary stops secured to said casings in a position to contact with said lugs on said sliding members, a spring-pressed catch lever rotatably mounted upon said stud and having its lower end engageable with said notches in said sliding member, and protecting hoods secured to said casings.

In testimony whereof I have hereunto set my hand in the presence of two witnesses.

MABEL A. ORME JONES.

Witnesses:
J. Wm. Ellis,
E. A. Kelly.

---

Copies of this patent may be obtained for five cents each, by addressing the "Commissioner of Patents, Washington, D. C."